March 30, 1943.  C. F. THOMPSON  2,315,298
ELECTROMAGNETIC CLUTCH
Filed April 29, 1942
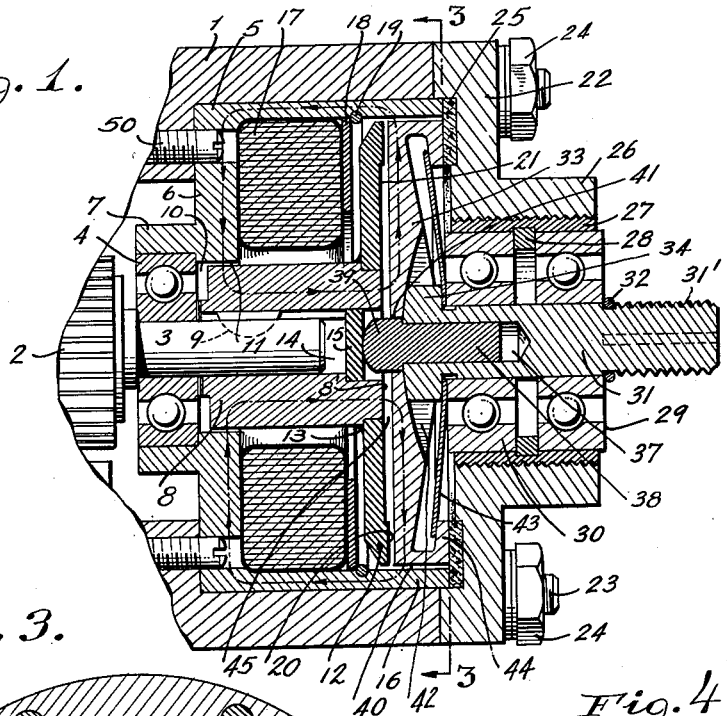
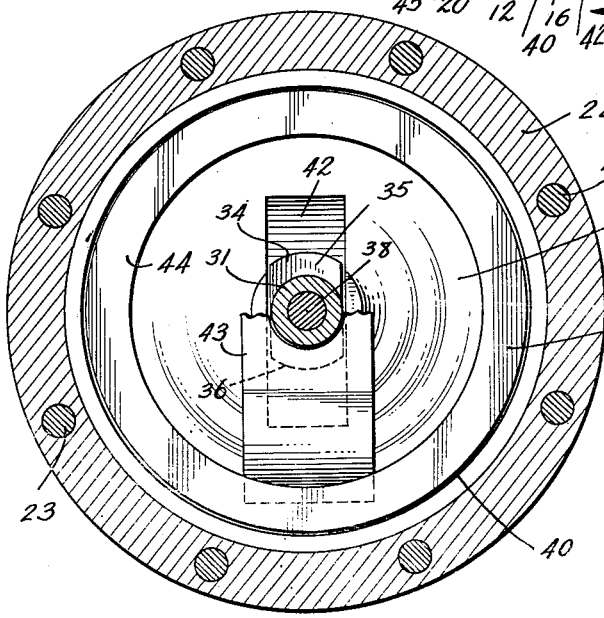
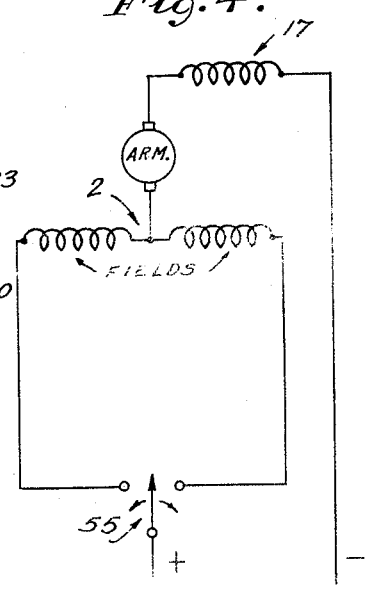
INVENTOR.
CLIFFORD F. THOMPSON
BY
ATTORNEY Patented Mar. 30, 1943

2,315,298

UNITED STATES PATENT OFFICE 2,315,298

ELECTROMAGNETIC CLUTCH

Clifford F. Thompson, Glen Rock, N. J., assignor to Air Associates Incorporated, Bendix, N. J., a corporation of New York Application April 29, 1942, Serial No. 440,938

6 Claims. (Cl. 192—9)

The present invention relates to an electromagnetic clutch and more particularly to a clutch of the friction type for a driving system wherein rapid, almost instantaneous, starting and stopping of the driven part of the system is required. This problem involves that, on the one hand, the mass of the parts to be accelerated in order to bring about the clutching movement be small, and on the other hand, that the clutching force acting on such small mass be great.

One of the objects of the invention, therefore, is the provision of an electromagnetic friction clutch of the disk type which has the indicated properties. It consists in that the axially movable clutch disk of the driven part is hubless in order to reduce its mass but so self-adjusting that its friction surface will be parallel to the friction surface of the driving part even if the two shafts of the disks respectively are at a slight angle with respect to each other in order to obtain greatest friction force. The invention also comprises means whereby the magnetic flux entering the movable disk is concentrated in a narrow ring zone near the disk center and whereby the air gap to be passed by the flux from the movable disk is of equal width throughout the disk periphery notwithstanding a misalignment of the shafts in order to obtain greatest magnetic force with the available electric power.

Further objects and details of the invention will be apparent from the description given hereinafter and the accompanying drawing illustrating an embodiment thereof by way of example. In the drawing:

Fig. 1 is a longitudinal cross-section of a clutch according to the invention in combination with an electric motor.

Fig. 2 is a side elevation of the shaft driven by the clutch in Fig. 1.

Fig. 3 is a section on the line 3—3 of Fig. 1.

Fig. 4 is a connection diagram of the motor and clutch.

Referring to the drawing of the illustrated embodiment, the clutch is shown in a common housing with an electric motor. In the housing 1, an electric motor 2 is arranged whose shaft 3 is journalled in a ball bearing 4. The housing which may be of any suitable material, such as aluminum if the device is intended for aircraft, contains in its interior a cylindrical insert 5 of magnetic material which is held stationary with respect to the outer housing 1 by means of set screws 50. Insert 5 is provided with flange 6 with a tubular projection 7 in which the face of the ball bearing 4 is fitted. A sleeve or hollow core 8 which consists also of magnetic material is keyed at 9 to the motor shaft 3 and its forward end projects into a cylindrical space 10 close to the bearing 4 and interiorly of the flange 6 of the insert 5. A narrow air gap 11 exists between the parts 8 and 6. The rearward end of sleeve 8 carries a disk 12 of non-magnetic material which is secured to the sleeve by any suitable means, such as soldering indicated at 13. Sleeve 8 projects rearwardly beyond the end of shaft 3, and its bore 14 is closed by a plug 15 arranged somewhat forward from the rear end of the sleeve. Between the cylindrical portion 16 of insert 5, flange 6, sleeve 8 and disk 12 a stationary solenoid 17 is secured to the inner housing by means of a washer 18 and split ring 19. Plate 12 whose outer periphery is slightly spaced from the inner wall of the insert 5 has a ring-shaped face 20 slightly projecting from the rear face 21 of the disk, whereas the rear face 8' of sleeve 8 is flush with the face 21. This face 20 serves as a clutching surface in cooperation with an axially movable clutching member described hereinafter while there is still a slight air gap between the latter and the rear face 8' of sleeve 8. Housing 1 has a cover 22 secured to housing 1 by means of screws 23 with nuts 24. Cover 22 is provided with a ring-shaped lining 25 which acts as a gasket with respect to the cylindrical portion 16 of the insert 5 and as a braking surface for said second clutch member. For this purpose, the lining is of a suitable high friction material, as, for instance, of cork. Cover 22 has a reduced cylindrical rearward projection 26 into which a bushing 27 is cast which carries a lock ring 28. The races of two ball bearings 29 and 30 are inserted in bushing 27 and bear from both sides against lock ring 28. Journalled in bearings 29 and 30 is the driven shaft 31 which is provided with another lock ring 32 abutting against the inner races of ball bearing 29, and with means such as the threaded end 31' for the attachment of a device to be operated by the motor and clutch assembly.

The afore-mentioned clutch member is a disk 33 carried by the front end of shaft 31 in such a manner that it is accurately centered when shifted in an axial direction but that it can slightly swivel about its center while being connected for common rotation with shaft 31. For this purpose, the front end 34 of shaft 31 is approximately hammer-shaped as clearly shown in Figs. 2 and 3 so that the diametrical projections 35 and 36 constitute keys in cooperation with the clutch disk 33. The front end of shaft 31 is also provided with an axial bore 37 into which a plug 38 with a cylindrical projecting head 39 of non-magnetic material such as brass is secured. In the assembled position, head 39 projects into the bore 14 of the sleeve 8 and may bear against the afore-mentioned plug 15. Head 39 prevents the transition of a magnetic flux from sleeve 8 to shaft 31 as will be more fully described hereinafter, and also constitutes a low friction bearing for the disk 33 which is movable thereon. Disk 33 has an outer diameter only slightly smaller than the inner wall of the insert 16 so as to form with the latter a narrow peripheral air gap 40. Disk 33 is so reduced in the thickness of its center that it bears on plug head 39 with only a very narrow edge 41. This narrow edge permits the disk to slightly swivel on plug head 39 without endangering correct centering of the disk, which centering is required in order to avoid the possibility of the outer periphery of disk 33 contacting the inner housing 16, and to safeguard the same width of gap 40 all around the periphery of disk 33. Disk 33 is provided with a diametrically arranged slot 42 in which the projections 35 and 36 of the shaft 31 engage with sufficient play required for the afore-mentioned swiveling of the disk 33. A leaf spring 43 is secured to the shaft 31 between its end 34 and the inner race of ball bearing 30. This spring engages behind an annular flange 44 of disk 33 and tends to urge flange 44 against the brake lining 25 of the housing cover 22.

Now, it will be clear that if the solenoid is energized, a magnetic flux will be set up which, starting from sleeve 8, passes through the rear face 8' thereof, crosses the gap 45 between the latter and the disk 33, leaves the disk through gap 40 into the cylindrical portion 16 of the insert 5, and passes on through flange 6 of that insert to return to the sleeve via the air gap 11. It will be noticed that the flux where crossing the gap 45 is concentrated to a narrow ring cross-section according to the face 8' of sleeve 8 and that it is shielded against spreading by the non-magnetic material of the disk 12 and the plug 39. Owing to the magnetic flux, disk 33 will be attracted against the restraint of spring 43 so as to bear against the annular surface 20 of disk 12, the air gap 45 then being reduced to the distance of surface 20 from face 21. Owing to the narrow bearing surface of edge 41, disk 33 can swivel on plug 39 while moving axially under the action of the magnetic force. Thereby, it is able to adjust itself according to such small inaccuracies as may exist notwithstanding best workmanship, so that engagement of the entire zone of the friction surface 20 will be ensured. On the other hand, disk 33 is so centered on plug 39 that the width of the air gap 45 is of like size throughout the entire periphery of the disk. If, now, shaft 3 is rotated by motor 2, this shaft takes along sleeve 8 with disk 12 and, owing to friction, also disk 33 which in turn rotates the driven shaft 31 owing to the key and slot arrangement constituted by the projections 35 and 36 engaging in slot 42. When the current in the solenoid is switched off, the magnetic flux collapses and spring 43 will pull disk 33 back against the lining 25 where it immediately comes to a standstill owing to the high friction between the lining 25 and flange 44. Here again the swiveling movement of the disk, or at least its capability to swivel, safeguards that the entire flange 44 will bear against the lining 25 so that the braking surface is fully utilized. The described clutch offers the advantage that the masses to be moved by the magnetic force are very small, and that the magnetic flux is very strong owing to the reduction of resistances.

If the clutch is connected in series witth the electric motor 2, as shown in Fig. 4, it will be clear that upon switching in of the motor the one way or the other by means of switch 55 the solenoid 17 will be immediately energized and cause clutching of the disk 32 to disk 12 before any appreciable rotation will have started. On the other hand, when motor 2 is switched off, disk 33 is immediately retracted against the braking surface 25 so that its rotary motion is abruptly stopped while the motor 2 still continues to rotate owing to the inertia of its mass.

It will be understood that various changes in the specific form of my novel clutch may be made without departing from my invention which is not limited by the particular disclosure of the embodiment thereof illustrated and described hereinabove but by the scope of the appended claims.

I claim:

1. An electromagnetic clutch comprising a cylindrical housing member of magnetic material including an interior flange, a rotatable sleeve of magnetic material forming a slight air gap with said flange and having a free end face, a first non-magnetic disk secured to said sleeve and having a friction zone close to its periphery and slightly projecting from the plane of the end face of said sleeve, a solenoid stationary between said housing member, said flange, said sleeve and said first disk, a shaft in substantially axial alignment with said sleeve and including a non-magnetic end close to said free end face of said sleeve, a second disk of magnetic material opposite said first disk and axially movable in relation to said shaft to engage said friction zone of said first disk when said solenoid is energized, resilient means in connection with said shaft to retract said second disk from engaging position when said solenoid is de-energized, and a swivel connection for common rotation of said second disk and said shaft.

2. In an electromagnetic clutch, a rotatable hollow core of magnetic material having a free, ring-shaped end face, a non-magnetic disk secured to said core and having an annular friction face near its periphery and slightly projecting in relation to said end face of said core, a shaft in substantially axial alignment with said core and having a free end of non-magnetic material and of a diameter approximately equal to that of the hollow space of said core, a magnetic, hubless disk axially movable on said free end of said shaft and adapted to engage said friction face of said non-magnetic disk, a swivel connection for common rotation of said magnetic disk and said shaft, a spring tending to hold said magnetic disk in disengaged position, and means to create a magnetic flux through said core and said magnetic disk so as to attract the latter into engagement with said friction face of the non-magnetic disk.

3. An electromagnetic clutch comprising a cylindrical housing member of magnetic material including an interior flange, a rotatable hollow core of magnetic material in said housing member and forming a slight air gap with said flange, said core having a free end face, a first non-magnetic disk secured to said core and having an annular friction zone close to its periphery and slightly projecting from the plane of said free end face, a solenoid stationary in said cylindrical housing between said flange and said first disk, a shaft projecting into said housing member in substantially axial alignment with said core and including a non-magnetic end portion, part of which projects into said core, a second disk of magnetic material on another part of said shaft end portion and interiorly of said cylindrical housing so as to form with the latter a narrow peripheral air gap, said second disk being free slightly to swivel and being axially movable with respect to said shaft so as to engage with one of its sides said friction face of said first disk without contacting said free face of said core, a stationary braking surface opposite the other side of said second disk, resilient means tending to shift said second disk into engagement with said braking surface, and a connection for common rotation of said second disk and said shaft.

4. In an electromagnetic clutch, a rotatable hollow core of magnetic material having a free, ring-shaped end face, a non magnetic disk secured to said core and having an annular friction face near its periphery and slightly projecting in relation to said end face of said core, a shaft in substantially axial alignment with said core and having a free end of non-magnetic material and of a diameter approximately equal to that of the hollow space of said core, a disk of magnetic material having a central bore fitting on said free end of said shaft, said disk being reduced in thickness of its portion surrounding said bore to a narrow edge so as to be free to swivel slightly in centered position on said shaft end, and being axially movable thereon, a connection for common rotation of said magnetic disk and said shaft, a spring tending to hold said magnetic disk in disengaged position, and means to create a magnetic flux through said core and said magnetic disk so as to attract the latter into engagement with said friction face of the non-magnetic disk.

5. A device as claimed in claim 4, wherein said shaft includes radial projections in the rear of said free end, and said magnetic disk is provided with radial grooves corresponding to said projections but slightly wider than the latter so as to permit a slight swiveling movement of said disk relatively to said shaft while the projections are in engagement with said grooves.

6. A device as claimed in claim 4, wherein said spring is a leaf spring including a middle portion secured to said shaft, and two end portions in engagement with portions of said magnetic disk close to its periphery.

CLIFFORD F. THOMPSON.